Patented Sept. 2, 1924.

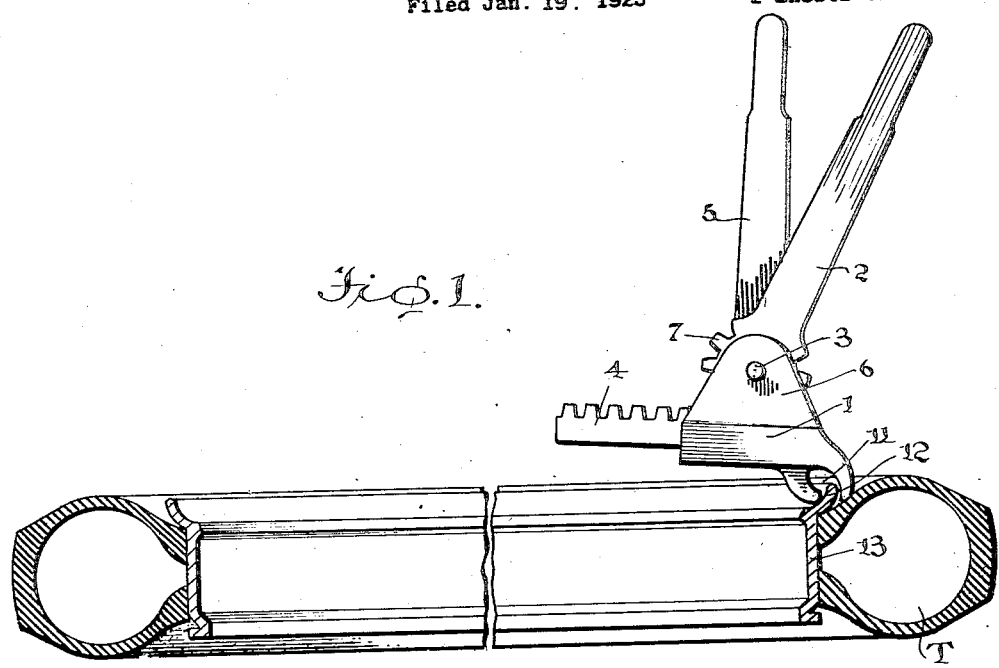
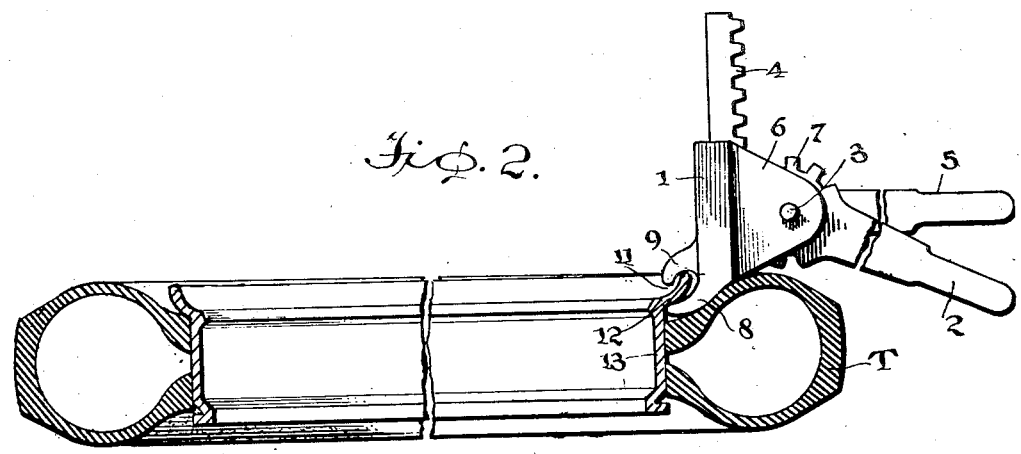

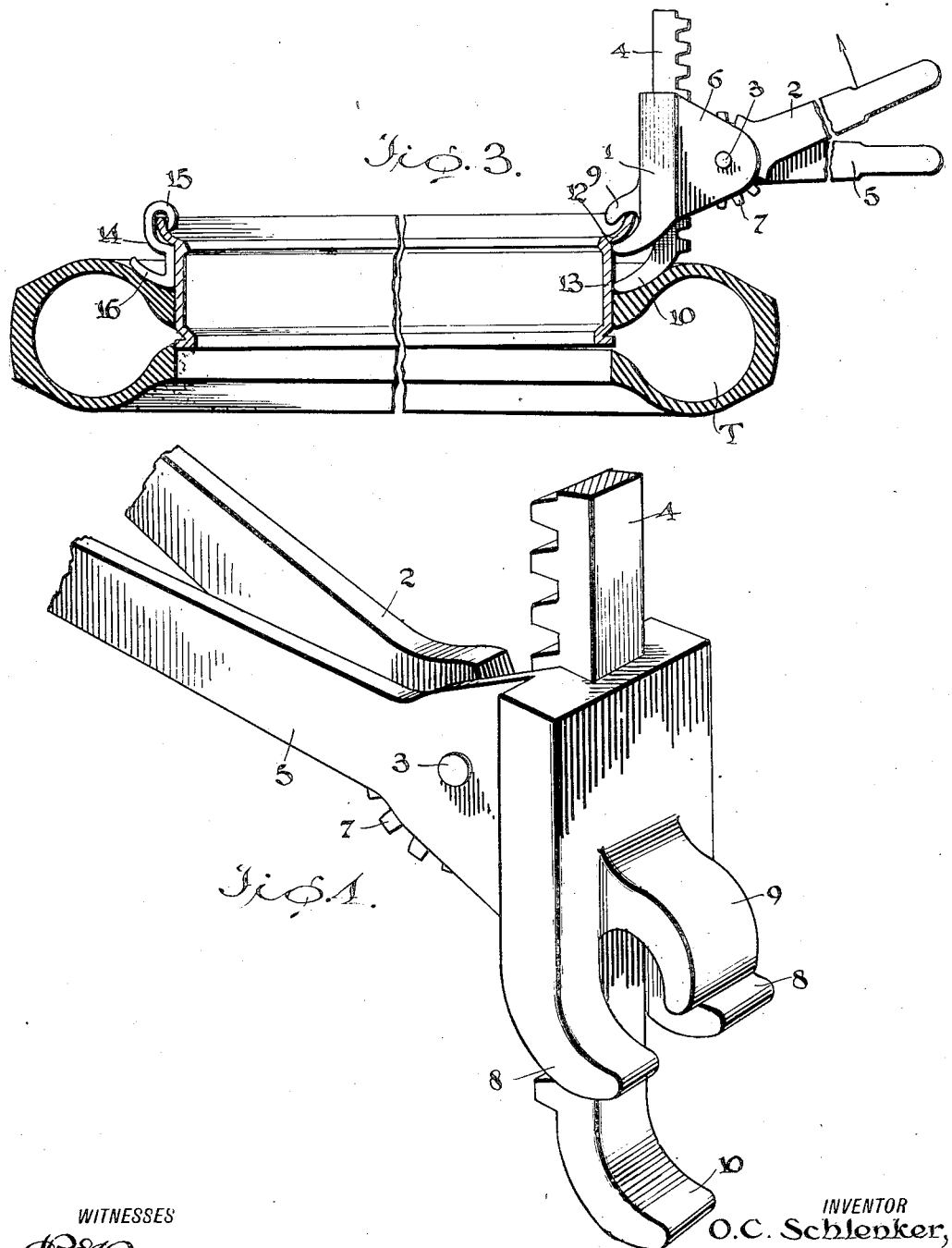

1,507,208

UNITED STATES PATENT OFFICE.

OSCAR CHARLES SCHLENKER, OF PLAINFIELD, INDIANA.

TIRE REMOVER.

Application filed January 19, 1923. Serial No. 613,744.

*To all whom it may concern:*

Be it known that I, OSCAR CHARLES SCHLENKER, a citizen of the United States, and a resident of Plainfield, in the county of Hendricks and State of Indiana, have invented certain new and useful Improvements in Tire Removers, of which the following is a specification.

My invention relates to improvements in tire removing appliances and it consists of the constructions, combinations and mode of operation herein described and claimed.

An object of the invention is to provide an appliance for removing the tires from disk, wire wheel and continuous type rims.

A further object of the invention is to provide an appliance for removing tires, and more especially straight-sided tires, said appliance having provision for securely engaging the rims of the various types and forcing the removal of the tire therefrom.

Other objects and advantages will appear in the following specification, reference being had to the accompanying drawings, in which:

Fig. 1 is a side elevation, the tire and rim being in section, showing the appliance ready for application to the rim, the levers being in the original upright position, Fig. 2 is a similar view showing the next step in the operation of removing the tire wherein the appliance has been moved around 90°, Fig. 3 is a similar view showing how the tire is separated from the rim by raising the movable lever, and Fig. 4 is a perspective view of the removing head and its associated parts.

By reference to the drawings it will be observed that the appliance is composed of only four parts, namely, the metallic frame 1, movable lever 2, pivot pin 3 and rack 4, The frame 1 carries a lever 5 which, being an integral part of the frame, is the means by which the appliance is moved from the position in Fig. 1 to the position in Fig. 2.

Spaced from the fixed lever 5 and forming a part of the frame 1 is the standard 6. The fixed lever and standard furnish the bearing support for the pivot 3. Furthermore, the space between the fixed lever 5 and standard 6 furnishes a guide channel for the rack 4 when the latter is actuated by the spur gear 7 of the movable lever 2.

The pivot pin 3 constitutes the center of the spur gear 7, and it is quite plain that a rotational movement of the handle 2 will cause a reciprocation of the rack 4 in the aforesaid guide channel by virtue of the fact that the spur gear is in engagement with the rack. The frame 1 has a pair of lips 8 (Fig. 4) spaced apart the distance of the guide channel, and a single opposing lip 9 which is also of substantially the same dimension in so far as width is concerned.

The rack 4 terminates in a lug 10 which is of a contour corresponding to that of the lips 8. When the rack 4 is stationed in the position in Figs. 1 and 2, the pair of lips 8 and the lug 10 are in transverse alinement, defining a recess 11 in which the flange 12 of the rim 13 is adapted to fit upon attachment of the appliance.

The operation.

Desiring to remove the tire T from the rim 13, the operator lays the two down as shown in Fig. 1. The tire remover is applied with the parts assuming the position in Fig. 1. At this time both the movable lever 2 and the fixed lever 5 assume substantially upright positions. As stated before, the lips 8 and lug 10 are brought into alinement so as to define a proper recess for the reception of the adjacent portion of the flange 12. Incidentally, the various lips and lug are so curved as to insure a firm grip of the appliance on the flange 12 of the rim when the removing operation commences.

The next step in removing the tire T is to move the fixed lever 5 90° from the position in Fig. 1, so that the position in Fig. 2 is reached. Of necessity, all associated parts must make a corresponding degree of movement. The reader will see that the opposing lips and lug now have a firm hold on the flange 12, and although the recess 11 is not in full conformity to the cross sectional contour of the flange 12, it is sufficiently so to insure the tight hold required.

In moving the appliance to the position in Fig. 2, a partial loosening of one side of the tire is accomplished even before the primary function of the appliance is inaugurated. The curved back walls of the alining lips 8 and lug 10 serve to press the adjacent side of the tire from the flange 12.

Having brought the appliance to the position in Fig. 2, the operator next holds the lever 5 rigidly, grasping the movable lever 2 and shifting it upward in the direction of the arrow in Fig. 3. The spur gear 7 causes the rack 4 to move downward, pushing the tire well away from the rim, or at least far enough away so that removal thereof is readily effected upon counter rotating the appliance to the position in Fig. 1. It is also to be observed that the curvature of the lug 10 corresponds favorably with the contour of the adjacent side of the tire T, thereby keeping the tire in a natural position while effecting removal. This feature eliminates all possibility of the tire becoming cramped during the operation.

Reference is again made to Fig. 3. Having gotten the tire T to the particular position shown in respect to the rim 13, it is of course desirable to keep it there and prevent it from possibly slipping back. Use is therefore made of a brace 14 which may be generally described as consisting of a curved head 15 adapted to grip the rim 12, and a base 16 adapted to engage the side of the tire. This brace insures the maintenance of a positive position of the tire in respect to the rim until further removal is effected.

While the construction and arrangement of the improved tire remover as herein described and claimed, is that of a generally preferred form, obviously modifications and changes may be made without departing from the spirit of the invention or the scope of the claims.

I claim:—

1. A tire remover comprising a frame, a single lip protruding from the front of the frame, a pair of opposing lips situated beneath said single lip and spaced laterally therefrom, a standard on back of the frame, a holding lever fixed to the frame beside the standard, a movable lever situated between the standard and holding lever having a spur gear pivoted therebetween, a rack engaged by said gear and guided in said frame, and a lug extending from said rack occupying the same plane as the single lip and being adapted to move into the space between said pair of lips.

2. A tire remover comprising a frame having a pair of spaced lips curving upward from the bottom, a single lip situated between and above said pair of lips and curving downward, a standard protruding from the back of the frame, a handle protruding from the frame beside the standard, a movable lever having a spur gear pivoted between the fixed lever and standard, a rack situated between the fixed lever and standard and guided thereby and a lug similar to said pair of lips extending from the bottom of the rack adapted to be moved into the space between said pair of lips to confront said single lip.

3. A tire remover comprising a frame having a spaced pair of lips, a rack guided by the frame having a lug alining with the lips when the tire remover is presented to a tire, a pair of levers carried by the frame also in alinement when the tire remover is presented to a tire, a gear carried by one of said levers having engagement with the rack, and means by which said gear lever is pivoted permitting a separating movement between the levers and between the pair of lips and lug.

4. A tire remover comprising a frame having a spaced pair of lips and an opposed single lip to grip the flange of a rim, a rack guided by the frame having a lug to contact the side of a tire and transversely alining with the pair of lips when the tire remover is presented to the tire, a pair of alining levers extending back from the frame one being fixed the other loose, a spur gear forming part of the loose lever and engaging the rack, and a pivot supported between a portion of the frame and the fixed lever upon which the loose lever is mounted to move away from the fixed lever to correspondingly move the lug from between said pair of lips to displace the tire.

OSCAR CHARLES SCHLENKER.